US012131690B2

(12) United States Patent
Lee

(10) Patent No.: US 12,131,690 B2
(45) Date of Patent: Oct. 29, 2024

(54) DISPLAY COMPENSATION SYSTEM AND DISPLAY PANEL COMPENSATION METHOD

(71) Applicant: LG Display Co., Ltd., Seoul (KR)

(72) Inventor: Yongsang Lee, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/523,461

(22) Filed: Nov. 29, 2023

(65) Prior Publication Data

US 2024/0257726 A1 Aug. 1, 2024

(30) Foreign Application Priority Data

Jan. 27, 2023 (KR) ........................ 10-2023-0011143

(51) Int. Cl.
*G09G 3/32* (2016.01)
*G09G 3/3233* (2016.01)

(52) U.S. Cl.
CPC ............. *G09G 3/32* (2013.01); *G09G 3/3233* (2013.01); *G09G 2300/0819* (2013.01); *G09G 2300/0842* (2013.01); *G09G 2310/0289* (2013.01); *G09G 2320/0233* (2013.01); *G09G 2330/021* (2013.01)

(58) Field of Classification Search
CPC ................... G09G 3/32; G09G 3/3233; G09G 2300/0819; G09G 2300/0842; G09G 2310/0289; G09G 2320/0233; G09G 2330/021
See application file for complete search history.

(56) References Cited

U.S. PATENT DOCUMENTS

| | | | | |
|---|---|---|---|---|
| 2009/0115718 | A1* | 5/2009 | Qiao | G09G 3/3611 345/102 |
| 2021/0312849 | A1* | 10/2021 | Park | G09G 3/006 |
| 2021/0383736 | A1* | 12/2021 | Hong | G09G 3/3233 |

* cited by examiner

*Primary Examiner* — Lixi C Simpson
(74) *Attorney, Agent, or Firm* — Morgan, Lewis & Bockius LLP

(57) ABSTRACT

Embodiments of the disclosure relate to a display compensation system and a display panel compensation method. Specifically, it is possible to enhance the luminance uniformity of the display panel by generating a current temporary shift voltage by adding a unit offset voltage to a previous temporary shift voltage, generating modified image data by compensating for image data based on the current temporary shift voltage, driving the display panel based on the modified image data, and reducing the luminance difference value which is the difference between the maximum luminance data and the minimum luminance data for the display panel.

15 Claims, 12 Drawing Sheets

| | Vdata1 | Vdata2 | Vdata3 | Vdata4 |
| --- | --- | --- | --- | --- |
| intermediate luminance band |  |  |  |  |
| low luminance band |  |  |  |  |

FIG. 11

| Case | TSV | diff |
|---|---|---|
| 1 | TSV1 | d1 |
| 2 | TSV2 | d2 |
| 3 | TSV3 | d3 |
| 4 | TSV4 | d4 |
| 5 | TSV5 | d5 |

➡

| Case | TSV | diff |
|---|---|---|
| 1 | 0 | 15 |
| 2 | 0.02 | 13 |
| 3 | 0.04 | 11 |
| 4 | 0.06 | 10 |
| 5 | 0.08 | 11 |

DISPLAY COMPENSATION SYSTEM AND DISPLAY PANEL COMPENSATION METHOD

CROSS-REFERENCE TO RELATED APPLICATION

This application claims priority from Korean Patent Application No. 10-2023-0011143, filed on Jan. 27, 2023, which is hereby incorporated by reference for all purposes as if fully set forth herein.

BACKGROUND

Technical Field

Embodiments of the disclosure relate to a display compensation system and a display panel compensation method.

Discussion of the Related Art

With the development of the information society, demand for display devices to display images is increasing in various forms, and various types of display devices, such as liquid crystal display devices, organic light emitting display devices, micro LED display devices, and quantum dot display devices, are being utilized.

In the display panel included in the display device, each subpixel disposed on the display panel may emit light with different luminances according to the process procedure, process characteristics, and individual characteristics of elements.

To drive the completed display panel with uniform luminance, it is necessary to secure a luminance difference for each position of the display panel.

Compensation data may be generated based on the corresponding luminance difference, and the compensation data may be applied to the display panel.

Accordingly, the luminance uniformity of the display panel may be enhanced.

SUMMARY

Accordingly, embodiments of the present disclosure are directed to a display compensation system and a display panel compensation method that substantially obviate one or more of the problems due to limitations and disadvantages of the related art.

An aspect of the disclosure is to provide a display compensation system and a display panel compensation method capable of enhancing the luminance uniformity of the display panel while efficiently utilizing memory space.

Another aspect of the disclosure is to provide a display compensation system and a display panel compensation method capable of enhancing the luminance uniformity of the display panel representing a low luminance band.

Another aspect of the disclosure is provide a display compensation system and a display panel compensation method capable of low power consumption by enhancing the luminance uniformity of the display panel.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a method for compensating for a display panel comprises a target driving step of generating a current temporary shift voltage by adding a unit offset voltage to a previous temporary shift voltage, generating modified image data by compensating for image data based on the current temporary shift voltage, and driving the display panel based on the modified image data, a photographed image generation step of generating a photographed image by photographing a video image displayed by the display panel, a luminance difference value storage step of storing a luminance difference value which is a difference between maximum luminance data and minimum luminance data in the photographed image including a plurality of luminance data, a luminance difference value comparison step of comparing a current luminance difference value and a previous luminance difference value which are the luminance difference value, and a shift voltage derivation step of storing the previous temporary shift voltage as a shift voltage in a memory when the current luminance difference value is larger than the previous luminance difference value.

According to embodiments of the disclosure, there may be provided a display compensation system and a display panel compensation method capable of enhancing the luminance uniformity of the display panel while efficiently utilizing memory space.

According to embodiments of the disclosure, there may be provided a display compensation system and a display panel compensation method capable of enhancing the luminance uniformity of the display panel representing a low luminance band.

According to embodiments of the disclosure, there may be provided a display compensation system and a display panel compensation method capable of low power consumption by enhancing the luminance uniformity of the display panel.

It is to be understood that both the foregoing general description and the following detailed description are exemplary and explanatory and are intended to provide further explanation of the inventive concepts as claimed.

BRIEF DESCRIPTION OF DRAWINGS

The accompanying drawings, which are included to provide a further understanding of the disclosure and are incorporated in and constitute a part of this application, illustrate embodiments of the disclosure and together with the description serve to explain various principles. In the drawings:

FIG. 11 is a view illustrating example values of a compensation data generation method according to embodiments of the disclosure.

DETAILED DESCRIPTION

Figure 1:
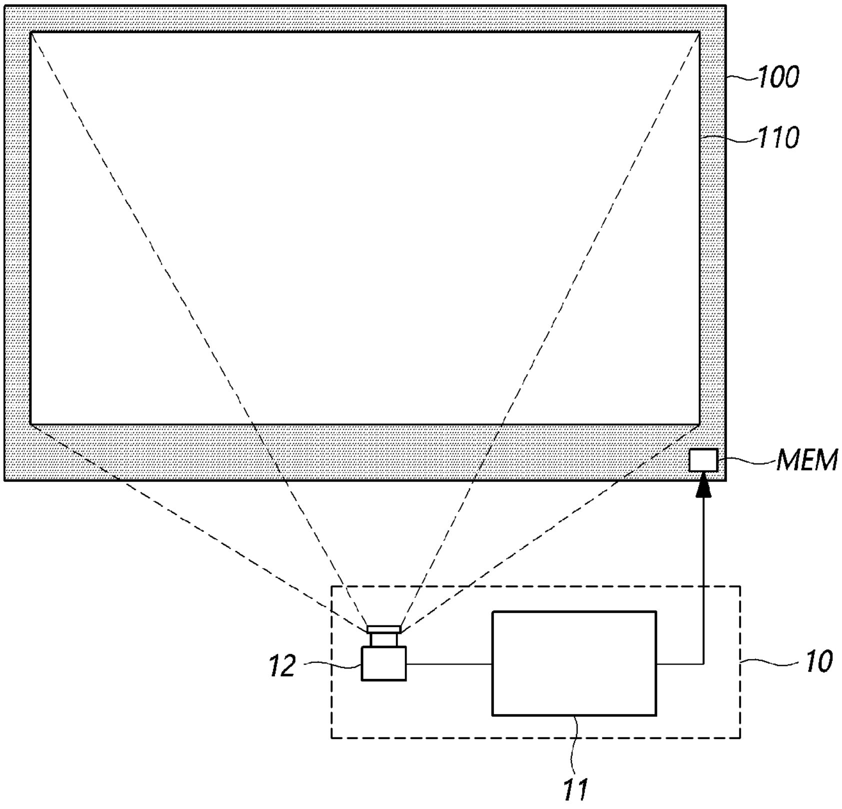
FIG. 1 illustrates a display compensation system according to embodiments of the disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the disclosure are described in detail with reference to the accompanying drawings.

FIG. 1 illustrates a display compensation system 10 according to embodiments of the disclosure.

Referring to FIG. 1, a display compensation system 10 according to embodiments of the disclosure may inspect the screen state of the display panel 110 of the display device 100 and provide software-wise display compensation capability to remove a screen glitch, such as screen blotches.

The display compensation system 10 according to embodiments of the disclosure may perform the display compensation function of generating compensation data for correcting the image data to be suitable for the state of the display panel 110 (the state at the time the panel is manufactured) so as to prevent screen glitch in the display panel 110 and storing the reference compensation data in the memory MEM of the display device 100.

Referring to FIG. 1, the display compensation system 10 may include a display compensation device 11 and a camera device 12.

The camera device 12 may photograph the image displayed on the display panel 110 of the display device 100 to be inspected and output the photographed image to the display compensating device 11. Hereinafter, to distinguish the image displayed on the display panel 110 from the image photographed by the camera device 120, the image displayed on the display panel 110 is denoted as a display image, and the image photographed by the camera device 120 is denoted as a photographed image IMG.

The display compensation device 11 may obtain the photographed image IMG from the camera device 12, generate reference compensation data based on the photographed image IMG, and store the reference compensation data in the memory MEM of the display device 100.

The display compensation device 11 may control the operation of at least one of the display device 100 and the camera device 12 to perform the display compensation function. For example, the display compensation device 11 may repeatedly display images of various grayscales on the display panel 110 for more accurate display compensation processing.

The compensation data, generated by the display compensation device 11 and stored in the memory MEM, may be used when the display device 100 drives the display.

Referring to FIG. 1, the display compensation device 11 and the camera device 12 included in the display compensation system 10 according to embodiments of the disclosure may be configured as separate devices or may be integrated and configured as one device.

Referring to FIG. 1, in the display compensation system 10 according to embodiments of the disclosure, the display compensation device 11 and the display device 100 may be connected by a wired cable or via a wireless interface such as Bluetooth or wireless LAN, or may be connected via a wired or wireless network.

The display device 100 requiring the display compensation function according to embodiments of the disclosure is briefly described below, followed by the description of the display compensation device 110 and display compensation method according to embodiments of the disclosure.

Figure 2:
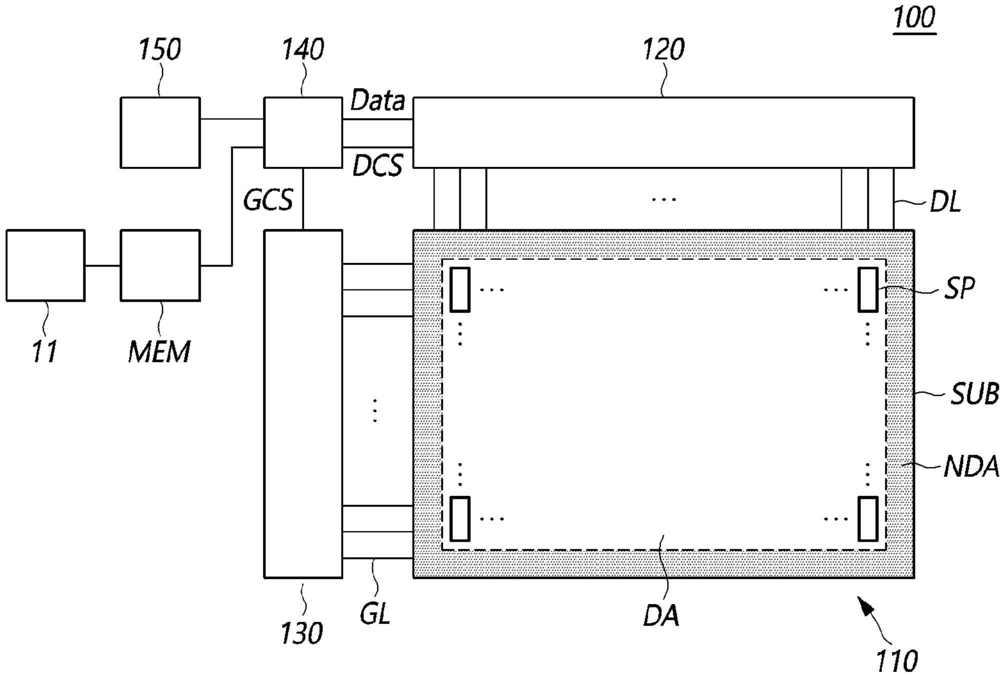
FIG. 2 illustrates a display device according to embodiments of the disclosure.

FIG. 2 illustrates a display device 100 according to embodiments of the disclosure.

Referring to FIG. 2, a display device 100 may include a display panel 110 and a driving circuit for driving the display panel 110. The driving circuits may include a data driving circuit 120 and a gate driving circuit 130. The display device 100 may further include a controller 140 controlling the data driving circuit 120 and the gate driving circuit 130.

Referring to FIG. 2, the display device 100 may include a memory MEM for storing the compensation data provided from the display compensation device 11. The memory MEM may be configured outside the controller 140 or may be an internal memory configured inside the controller 140.

Referring to FIG. 2, the display panel 110 may include a substrate SUB and signal lines, such as a plurality of data lines DL and a plurality of gate lines GL disposed on the substrate SUB.

The display panel 110 may include a plurality of subpixels SP connected to the plurality of data lines DL and the plurality of gate lines GL.

Referring to FIG. 2, the display panel 110 may include a display area DA in which images are displayed and a non-display area NDA in which no image is displayed. In the display panel 110, a plurality of subpixels SP for displaying images may be disposed in the display area DA, and the driving circuits 120, 130, and 140 may be electrically connected or disposed in the non-display area NDA. Further, pad units for connection of integrated circuits or a printed circuit may be disposed in the non-display area NA.

Referring to FIG. 2, the data driving circuit 120 is a circuit for driving the plurality of data lines DL, and may supply data signals to the plurality of data lines DL.

Referring to FIG. 2, the gate driving circuit 130 is a circuit for driving the plurality of gate lines GL, and may supply gate signals to the plurality of gate lines GL. The controller 140 may supply a data control signal DCS to the data driving circuit 120 to control the operation timing of the data driving circuit 120. The controller 140 may supply a gate control signal GCS for controlling the operation timing of the gate driving circuit 130 to the gate driving circuit 130.

Referring to FIG. 2, the controller 140 may start scanning according to a timing implemented in each frame, convert input image data input from the outside into image data Data suited for the data signal format used in the data driving circuit 120, supply the image data Data to the data driving circuit 120, and control data driving at an appropriate time suited for scanning.

The controller 140 receives, from the outside (e.g., a host system 150), various timing signals including a vertical synchronization signal, a horizontal synchronization signal, an input data enable signal Data Enable, and a clock signal, along with the input image data.

To control the data driving circuit 120 and the gate driving circuit 130, the controller 140 receives timing signals, such as the vertical synchronization signal, horizontal synchronization signal, input data enable signal, and clock signal, generates various control signals DCS and GCS, and outputs the control signals to the data driving circuit 120 and the gate driving circuit 130.

As an example, to control the gate driving circuit 130, the controller 140 outputs various gate control signals including a gate start pulse, a gate shift clock, and a gate output enable signal (Gate Output Enable, GOE).

To control the data driving circuit 120, the controller 140 outputs various data control signals DCS including, e.g., a source start pulse, a source sampling clock, and a source output enable signal.

The controller 140 may be implemented as a separate component from the data driving circuit 120, or the controller 140, along with the data driving circuit 120, may be implemented as an integrated circuit.

The data driving circuit 120 receives the image data Data from the controller 140 and supply data voltages to the plurality of data lines DL, thereby driving the plurality of data lines DL. The data driving circuit 120 is also referred to as a 'source driving circuit.'

The data driving circuit 120 may include one or more source driver integrated circuits.

Each source driver integrated circuit may include a shift register, a latch circuit, a digital-to-analog converter, an output buffer, and the like. In some cases, each source driver integrated circuit may further include an analog-to-digital converter.

For example, each source driver integrated circuit may be connected with the display panel 110 by a tape automated bonding method or connected to a bonding pad of the display panel 110 by a chip on glass or chip on panel method or may be implemented by a chip on film method and connected with the display panel 110.

The gate driving circuit 130 may output a gate signal of a turn-on level voltage or a gate signal of a turn-off level voltage according to the control of the controller 140. The gate driving circuit 130 may sequentially drive the plurality of gate lines GL by sequentially supplying gate signals of the turn-on level voltage to the plurality of gate lines GL.

The gate driving circuit 130 may be connected with the display panel 110 by the tape automated bonding method or connected to a bonding pad of the display panel 110 by the chip on glass or chip on panel method or may be connected with the display panel 110 according to the chip on film method. Alternatively, the gate driving circuit 130 may be formed in a gate in panel type, in the non-display area NDA of the display panel 110. The gate driving circuit 130 may be disposed on the substrate SUB or may be connected to the substrate SUB. In other words, the gate driving circuit 130 that is of a GIP type may be disposed in the non-display area NDA of the substrate SUB. The gate driving circuit 130 that is of a chip-on-glass (COG) type or chip-on-film (COF) type may be connected to the substrate SUB.

Meanwhile, at least one of the data driving circuit 120 and the gate driving circuit 130 may be disposed in the display area DA. For example, at least one of the data driving circuit 120 and the gate driving circuit 130 may be disposed not to overlap the subpixels SP or to overlap all or some of the subpixels SP.

When a specific gate line GL is opened by the gate driving circuit 130, the data driving circuit 120 may convert the image data Data received from the controller 140 into an analog data voltage and supply it to the plurality of data lines DL.

The data driving circuit 120 may be connected to one side (e.g., an upper or lower side) of the display panel 110. Depending on the driving scheme or the panel design scheme, data driving circuits 120 may be connected with both the sides (e.g., both the upper and lower sides) of the display panel 110, or two or more of the four sides of the display panel 110.

The gate driving circuit 130 may be connected to one side (e.g., a left or right side) of the display panel 110. Depending on the driving scheme or the panel design scheme, gate driving circuits 130 may be connected with both the sides (e.g., both the left and right sides) of the display panel 110, or two or more of the four sides of the display panel 110.

The controller 140 may be a timing controller used in typical display technology, a control device that may perform other control functions as well as the functions of the timing controller, or a control device other than the timing controller, or may be a circuit in the control device. The controller 140 may be implemented as various circuits or electronic components, such as an integrated circuit (IC), a field programmable gate array (FPGA), an application specific integrated circuit (ASIC), or a processor.

The controller 140 may be mounted on a printed circuit board or a flexible printed circuit and may be electrically connected with the data driving circuit 120 and the gate driving circuit 130 through the printed circuit board or the flexible printed circuit.

The controller 140 may transmit/receive signals to/from the data driving circuit 120 according to one or more predetermined interfaces. The interface may include, e.g., a low voltage differential signaling (LVDS) interface, an EPI interface, and a serial peripheral interface (SPI).

The controller 140 may include a storage medium, such as one or more registers.

The display device 100 according to embodiments of the disclosure may be a display including a backlight unit, such as a liquid crystal display, or may be a self-emission display, such as an organic light emitting diode (OLED) display, a quantum dot display, or a micro light emitting diode (LED) display.

If the display device 100 according to embodiments of the disclosure is an OLED display, each subpixel SP may include an organic light emitting diode (OLED), which by itself emits light, as the light emitting element. If the display device 100 according to embodiments of the disclosure is a quantum dot display, each subpixel SP may include a light emitting element formed of a quantum dot, which is a self-luminous semiconductor crystal. If the display device 100 according to embodiments of the disclosure is a micro LED display, each subpixel SP may include a micro light emitting diode (LED) or mini LED, which is self-emissive and formed of an inorganic material, as the light emitting element.

Figure 3A:
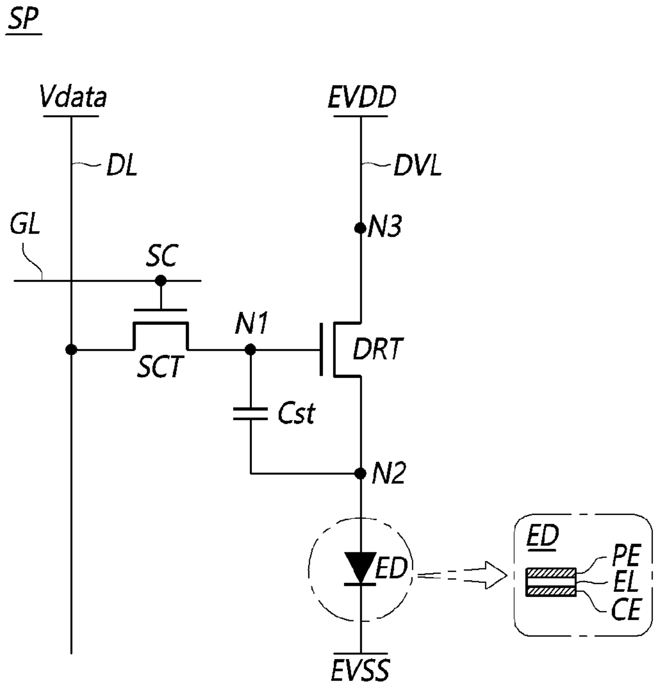
FIGS. 3A and 3B are equivalent circuit diagrams illustrating a subpixel of a display device according to embodiments of the disclosure.
Figure 3B:
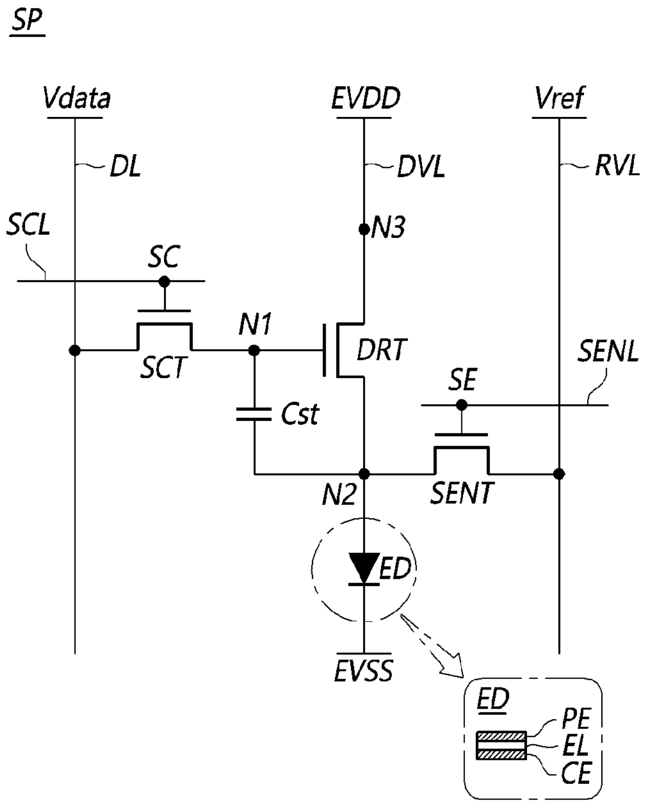

FIGS. 3A and 3B are equivalent circuit diagrams illustrating a subpixel SP of a display device 100 according to embodiments of the disclosure.

Referring to FIG. 3A, each of a plurality of subpixels SP disposed on a display panel 110 of a display device 100 according to embodiments of the disclosure may include a light emitting element ED, a driving transistor DRT, a scan transistor SCT, and a storage capacitor Cst.

The light emitting element ED may include a pixel electrode PE and a common electrode CE and may include a light emitting layer EL positioned between the pixel electrode PE and the common electrode CE.

The pixel electrode PE of the light emitting element ED may be an electrode disposed in each subpixel SP, and the common electrode CE may be an electrode commonly disposed in all the subpixels SP. Here, the pixel electrode PE may be an anode electrode, and the common electrode CE may be a cathode electrode. Conversely, the pixel electrode PE may be a cathode electrode, and the common electrode CE may be an anode electrode.

For example, the light emitting element ED may be an organic light emitting diode (OLED), an inorganic light emitting diode (LED), or a quantum dot light emitting element.

The driving transistor DRT is a transistor for driving the light emitting element ED, and may include a first node N1, a second node N2, and a third node N3.

The first node N1 of the driving transistor DRT may be a gate node of the driving transistor DRT, and may be electrically connected with a source node or a drain node of the scan transistor SCT. The second node N2 of the driving transistor DRT may be a source node or a drain node of the driving transistor DRT, and may be electrically connected with a source node or a drain node of the sensing transistor SENT and may also be electrically connected with the pixel electrode PE of the light emitting element ED. The third node N3 of the driving transistor DRT may be electrically connected with a driving voltage line DVL supplying a driving voltage EVDD.

The scan transistor SCT may be controlled by a scan signal SC, which is a type of gate signal, and may be connected between the first node N1 of the driving transistor DRT and the data line DL. In other words, the scan transistor SCT may be turned on or off according to the scan signal SC supplied from the scan signal line SCL, which is a type of the gate line GL, controlling the connection between the data line DL and the first node N1 of the driving transistor DRT.

The scan transistor SCT may be turned on by the scan signal SC having a turn-on level voltage and transfer the data voltage Vdata supplied from the data line DL to the first node N1 of the driving transistor DRT.

If the scan transistor SCT is an n-type transistor, the turn-on level voltage of the scan signal SC may be a high level voltage. If the scan transistor SCT is a p-type transistor, the turn-on level voltage of the scan signal SC may be a low level voltage.

The storage capacitor Cst may be electrically connected between the first node N1 and second node N2 of the driving transistor DRT. The storage capacitor Cst is charged with the quantity of electric charge corresponding to the voltage difference between both ends thereof and serves to maintain the voltage difference between both ends for a predetermined frame time. Accordingly, during the predetermined frame time, the corresponding subpixel SP may emit light.

Referring to FIG. 3B, each of the plurality of subpixels SP disposed on the display panel 110 of the display device 100 according to embodiments of the disclosure may further include a sensing transistor SENT.

The sensing transistor SENT may be controlled by a sense signal SE, which is a type of gate signal, and may be connected between the second node N2 of the driving transistor DRT and the reference voltage line RVL. In other words, the sensing transistor SENT may be turned on or off according to the sense signal SE supplied from the sense signal line SENL, which is another type of the gate line GL, controlling the connection between the reference voltage line RVL and the second node N2 of the driving transistor DRT.

The sensing transistor SENT may be turned on by the sense signal SE having a turn-on level voltage and transfer a reference voltage Vref supplied from the reference voltage line RVL to the second node N2 of the driving transistor DRT.

The sensing transistor SENT may be turned on by the sense signal SE having a turn-on level voltage, transferring the voltage of the second node N2 of the driving transistor DRT to the reference voltage line RVL. If the sensing transistor SENT is an n-type transistor, the turn-on level voltage of the sense signal SE may be a high level voltage. If the sensing transistor SENT is a p-type transistor, the turn-on level voltage of the sense signal SE may be a low level voltage.

The function in which the sensing transistor SENT transfers the voltage of the second node N2 of the driving transistor DRT to the reference voltage line RVL may be used upon driving to sense the characteristic value of the subpixel SP. In this case, the voltage transferred to the reference voltage line RVL may be a voltage for calculating the characteristic value of the subpixel SP or a voltage reflecting the characteristic value of the subpixel SP.

In the disclosure, the characteristic value of the subpixel SP may be a characteristic value of the driving transistor DRT or the light emitting element ED. The characteristic value of the driving transistor DRT may include a threshold voltage and mobility of the driving transistor DRT. The characteristic value of the light emitting element ED may include a threshold voltage of the light emitting element ED.

Each of the driving transistor DRT, the scan transistor SCT, and the sensing transistor SENT may be an n-type transistor or a p-type transistor. In the disclosure, for convenience of description, each of the driving transistor DRT, the scan transistor SCT, and the sensing transistor SENT is an n-type transistor.

The storage capacitor Cst is not a parasitic capacitor (e.g., Cgs or Cgd) which is an internal capacitor existing between the gate node and the source node (or drain node) of the driving transistor DRT, but may be an external capacitor intentionally designed outside the driving transistor DRT.

The scan signal line SCL and the sense signal line SENL may be different gate lines GL. In this case, the scan signal SC and the sense signal SE may be separate gate signals, and the on-off timings of the scan transistor SCT and the on-off timings of the sense transistor SENT in one subpixel SP may be independent. In other words, the on-off timings of the scan transistor SCT and the on-off timings of the sensing transistor SENT in one subpixel SP may be the same or different.

Alternatively, the scan signal line SCL and the sense signal line SENL may be the same gate line GL. In other words, the gate node of the scan transistor SCT and the gate node of the sensing transistor SENT in one subpixel SP may be connected with one gate line GL. In this case, the scan signal SC and the sense signal SE may be the same gate signals, and the on-off timings of the scan transistor SCT and the on-off timings of the sense transistor SENT in one subpixel SP may be the same.

The structures of the subpixel SP shown in FIGS. 3A and 3B are merely examples, and various changes may be made thereto, e.g., such as including one or more transistors or one or more capacitors. Although the subpixel structure is described in connection with FIGS. 3A and 3B under the assumption that the display device 100 is a self-emission display device, if the display device 100 is a liquid crystal display, each subpixel SP may include a transistor and a pixel electrode according to a general structure.

Meanwhile, the light emitting elements ED and/or transistors DRT, SCT, and SENT disposed on the display panel 110 may not have the same characteristic values for various reasons, such as material characteristics and process deviations, but may have characteristic value deviations. In this case, a luminance deviation between the plurality of subpixels SP may occur, resulting in image quality degradation, such as screen blotches and image unevenness.

Thus, the display device 100 may compensate for the image data and drive the display panel 110 so that the display panel 110 does not produce screen glitches, such as screen blotches, image unevenness, and the like. Accordingly, it may be critical to generate compensation data that accurately reflects the state of the display panel 110 at the time the display panel 110 is manufactured.

Accordingly, the display compensation system 10 according to embodiments of the disclosure is a system for accurately generating compensation data that accurately reflects the state of the display panel 110 at the time the display panel 110 is manufactured.

Figure 4:
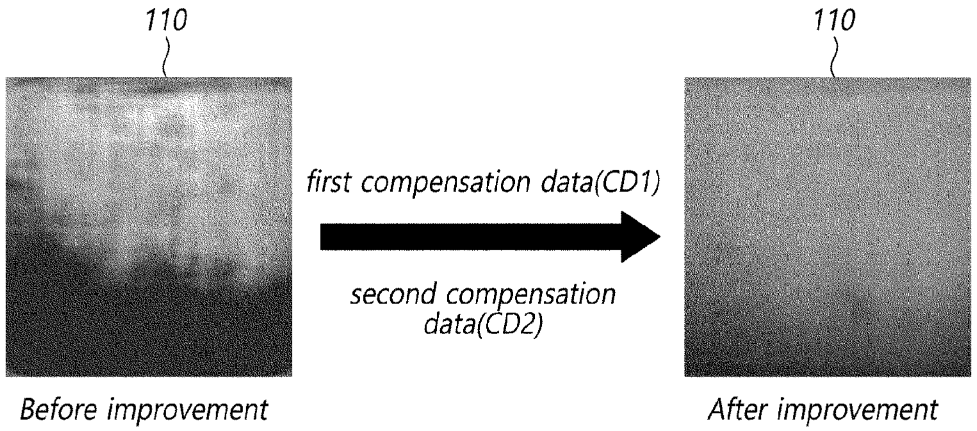
FIG. 4 is a view illustrating the luminance uniformity of a display panel according to embodiments of the disclosure.

FIG. 4 is a view illustrating the luminance uniformity of a display panel according to embodiments of the disclosure.

Figure 5:
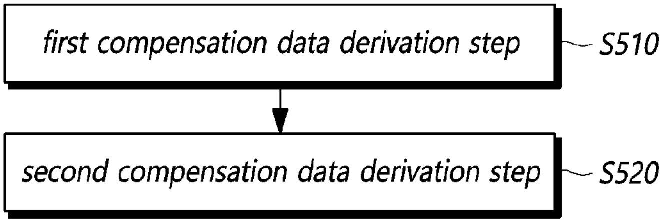
FIG. 5 is a flowchart illustrating a method for generating compensation data according to embodiments of the disclosure.

FIG. 5 is a flowchart illustrating a method for generating compensation data according to embodiments of the disclosure.

Referring to FIG. 4, the display panel 110 before the luminance uniformity is enhanced and the display panel 110 after the luminance uniformity is enhanced may be identified.

As the first compensation data CD1 and the second compensation data CD2 are applied to the display panel 110, the luminance uniformity of the display panel 110 may be enhanced.

The first compensation data CD1 may be derived through a first compensation data derivation step S510, and the second compensation data CD2 may be derived through a second compensation data derivation step S520.

Referring to FIG. 5, the method for generating compensation data may include the first compensation data derivation step S510 and a second compensation data derivation step S520.

The first compensation data derivation step S510 may be the step of deriving the first compensation data CD1.

The first compensation data CD1 may include a plurality of gain data groups GDG and a plurality of offset data groups ODG.

The plurality of gain data groups GDG may include a gain data group GDG1 for a first grayscale to a gain data group GDGn for an nth grayscale. The plurality of offset data groups ODG may include an offset data group ODG1 for the first grayscale to an offset data group ODGn for the nth grayscale.

Each of the plurality of gain data groups GDG may include a plurality of gain data (gain). Each of the plurality of offset data groups ODG may include a plurality of offset data (offset).

A process of deriving the first compensation data CD1 is as follows.

The display panel 110 may be driven to display a solid pattern representing a specific grayscale. The particular grayscale may be a low grayscale or a high grayscale. For example, if the grayscale value range is 0 grayscale to 255 grayscale, the specific grayscale may be 0 grayscale to 255 grayscale. The display panel 110 may be driven with a solid pattern, but may also be driven to display other video images if necessary.

The display panel 110 driven at a specific grayscale may be photographed through the camera device 12.

The camera device 12 may photograph the image displayed on the display panel 110 and output the photographed image to the display compensating device 11.

After receiving the photographed image IMG from the camera device 12, the display compensation device 11 may generate first compensation data CD1.

The photographed image IMG may be a luminance data group LDG including a plurality of luminance data LD.

The plurality of luminance data LD may be data corresponding to the luminance value for a specific position of the display panel 110.

The number of luminance data LD may correspond to the size of the resolution of the display panel 110. For example, if the resolution of the display panel 110 is HD (1280*720), the number of luminance data LD may be 1280*720. If the resolution of the display panel 110 is FHD (1920*1080), the number of luminance data LD may be 1920*1080. If the resolution of the display panel 110 is UHD (3840*2160), the number of luminance data LD may be 3840*2160.

Assuming an ideal display panel 110, the plurality of luminance data LDs all have the same size.

As the per-position luminances of the display panel 110 have the same or similar values to each other, the luminance uniformity of the display panel 110 may be enhanced. As the luminance uniformity of the display panel 110 increases, the quality of the display panel 110 may be enhanced.

However, in the case of the actual display panel 110, the plurality of luminance data LD may be data of different sizes.

To enhance luminance uniformity of the display panel 110, compensation data CD may be derived based on a plurality of luminance data LD.

The display panel 110 may include a plurality of subpixels SP, and as each of the plurality of subpixels SP is driven, the display panel 110 may display an image frame. Each of the plurality of subpixels SP may emit light when receiving the data voltage Vdata, and thus an image frame may be displayed. The data voltage Vdata is generated based on the image data.

Assuming an ideal display panel 110, a monochromatic image may be displayed as the data voltage Vdata based on the same image data is supplied to the plurality of subpixels SP. In other words, the ideal display panel 110 may be driven at the uniform luminance.

However, the actual display panel 110 may have a deviation in the characteristic value of the plurality of subpixels SP. Therefore, when the data voltage Vdata based on the same image data is supplied to the plurality of subpixels SP, an image including blotch may be displayed instead of a monochrome image. In other words, the actual display panel 110 may be driven at non-uniform luminances. To prevent this, modified image data may be generated by compensating for image data.

When the data voltage Vdata based on the modified image data is supplied to the plurality of subpixels SP, a monochromatic image may be displayed. In other words, it is possible to enhance luminance uniformity of the display panel 110 by compensating for the image data.

The modified image data may be generated by compensating for image data based on gain data (gain) and offset data (offset). The modified image data may be "image data*gain data (gain)+offset data (offset)". In other words, the modified image data may be data produced by multiplying the image data by the gain data (gain) and then adding the offset data (offset).

As the modified image data is supplied to each of the plurality of subpixels SP, the luminance uniformity of the display panel 110 may be enhanced. As each of the plurality of subpixels SP receives the modified image data, the number of gain data (gain) and the number of offset data (offset) may be the same as the number of the plurality of subpixels SP. Since the number of subpixels SP and the size of the resolution of the display panel 110 may be the same, the number of gain data (gain) and the number of offset data (offset) may be the same as the size of the resolution of the display panel 110.

A plurality of gain data (gain) and a plurality of offset data (offset) may be derived based on a plurality of luminance data LD.

The gain data (gain) may be data for compensating for mobility (electron mobility) of the driving transistor DRT included in the corresponding subpixel SP.

The offset data (offset) may be data for compensating for the threshold voltage of the driving transistor DRT included in the corresponding subpixel SP.

The size of the gain data (gain) and the size of the offset data (offset) may be derived as a data size that makes the luminance of the display panel 110 uniform. In other words, a plurality of luminance data LD of the image photographed before compensation are measured as different data, but a plurality of luminance data LD of the image photographed after compensation may be measured as the same data or similar data.

A plurality of gain data (gain) and a plurality of offset data (offset) may be derived corresponding to a plurality of subpixels SP. Since each of the plurality of subpixels SP has a different characteristic value, a plurality of gain data (gain) and a plurality of offset data (offset) may be derived for each subpixel SP. For example, a gain data and a offset data may be derived for the ath subpixel, and b gain data and b offset data may be derived for the bth subpixel.

In other words, a gain data group GDG including a plurality of gain data (gain) for the display panel 110 driven at a specific grayscale and an offset data group ODG including a plurality of offset data offset for the display panel 110 driven at a specific grayscale may be derived by the above-described method.

The gain data (gain) and the offset data (offset) for the display panel 110 to be driven at the uniform luminance may be varied depending on the grayscale represented by the display panel 110.

Therefore, it is necessary to secure a gain data group GDG and an offset data group ODG for various grayscales. The gain data group GDG and offset data group ODG for various grayscales may be derived by an interpolation method.

For example, the display panel 110 may be driven at the ath grayscale, deriving the gain data group GDGa for the ath grayscale and the offset data group ODGa for the ath grayscale. The display panel 110 may be driven at the bth grayscale, and a gain data group GDGb for the bth grayscale and an offset data group ODGb for the bth grayscale may be derived.

Subsequently, interpolation may be applied to the gain data group GDGa for the ath grayscale and the gain data group GDGb for the bth grayscale to derive gain data groups GDGab for the entire grayscale. Further, the offset data groups ODGab for the entire grayscale may be derived by applying an interpolation method to the offset data group ODGa for the ath grayscale and the offset data group ODGb for the bth grayscale.

The above-described interpolation method may be an interpolation method based on a gamma curve representing the relationship between grayscale and luminance. The gamma data may be 2.2, which is the standard in the display field, and may be larger or smaller than 2.2 depending on design.

When the grayscale range is 0 grayscale to 255 grayscale, the ath grayscale may be a value between a middle grayscale and a high grayscale, and the bth grayscale may be a value between a low grayscale and the middle grayscale. For example, the ath grayscale may be about 190 grayscale, and the bth grayscale may be about 30 grayscale.

Through the above-described interpolation method, the gain data groups GDGab for the entire grayscale and offset data groups ODGab for the entire grayscale may be derived.

The gain data groups GDGab for the entire grayscale and the offset data groups ODGab for the entire grayscale may be stored in the memory MEM. The size of gain data (gain) for the entire grayscale and offset data (offset) for the entire grayscale may occupy a significant portion of the memory MEM.

The gain data groups GDGab for the entire grayscale may be referred to as a first map Map1 or a first gain map GainMap1.

The offset data groups ODGab for the entire grayscale may be referred to as a second map Map2. The offset data groups ODGab for the entire grayscale may be referred to as a first offset map OffetMap1.

The first compensation data CD1 may include a first gain map GainMap1 that is the gain data groups GDGab for the entire grayscale and a first offset map OffetMap1 that is offset data groups ODGab for the entire grayscale. In other words, the first compensation data CD1 may include a total of two maps Map1 and Map2.

After the first compensation data derivation step S510 proceeds, the second compensation data derivation step S520 may proceed.

The second compensation data derivation step S520 may be the step of deriving the second compensation data CD2.

The first compensation data CD1 may include the gain data groups GDGab for the entire grayscale and the offset data groups ODGab for the entire grayscale. However, since the above-described gain data groups GDGab for the entire grayscale and offset data groups ODGab for the entire grayscale were derived through interpolation, although the gain data (gain) and offset data (offset) derived by interpolation are applied to the display panel 110, the luminance uniformity of the display panel 110 may not be enhanced.

For example, the luminance of the display panel 110 driving a grayscale smaller than the bth grayscale may not be uniform. To address this issue, it is necessary to derive the second compensation data CD2.

The second compensation data CD2 may include a plurality of offset data groups ODG' that are the second offset map OffetMap2. The plurality of offset data groups ODG may include an offset data group ODG1' for the first grayscale to an offset data group ODGk' for the kth grayscale. Each of the plurality of offset data groups ODG' may include a plurality of offset data (offset').

A process of deriving the second offset map OffetMap2 is as follows.

The display panel 110 may be driven at the cth grayscale.

The cth grayscale may be a grayscale smaller than the bth grayscale. For example, the cth grayscale may be 10 grayscale.

The display panel 110 driven at the cth grayscale may be photographed by the camera device 12 to generate a photographed image IMG.

The photographed image IMG may be a luminance data group LDG' including a plurality of luminance data LD'.

A plurality of offset data (offset') may be derived based on the luminance data group (LDG').

The offset data (offset') may be data for compensating for the threshold voltage of the driving transistor DRT included in the corresponding subpixel SP.

The size of the offset data (offset) may be derived as a data size that makes the luminance of the display panel 110 uniform. In other words, a plurality of luminance data LD' of the image photographed before compensation are measured as different data, but a plurality of luminance data LD' of the image photographed after compensation may be measured as the same data or similar data.

A plurality of offset data (offset) may be derived corresponding to a plurality of subpixels SP. Since each of the plurality of subpixels SP has a different characteristic value, a plurality of offset data (offset) may be derived for each subpixel SP. For example, x offset data may be derived for the xth subpixel, and y offset data may be derived for the yth subpixel.

By the above-described method, an offset data group ODG including a plurality of offset data (offset) for the display panel 110 driven at the cth grayscale may be derived.

The offset data groups ODGbc for grayscales smaller than the bth grayscale may be derived by applying an interpolation method to the offset data group ODGc for the cth grayscale and the offset data group ODGb for the bth grayscale.

The offset data groups ODGbc for grayscales smaller than the bth grayscale may include an offset data group ODG1+ for the first grayscale to an offset data group ODGk+ for the kth grayscale.

The offset data groups ODGbc for grayscales smaller than the bth grayscale may be stored in the memory MEM.

The offset data groups ODGbc for grayscales smaller than the bth grayscale may be referred to as a third map Map3. The offset data groups ODGbc for grayscales smaller than the bth grayscale may be referred to as a second offset map OffetMap2.

The second compensation data CD2 may include the second offset map OffetMap2 that is offset data groups ODGbc for grayscales smaller than the bth grayscale.

In sum, the first compensation data CD1 was derived in the first compensation data derivation step S510, and the second compensation data CD2 was derived in the second compensation data derivation step S520. The first compensation data CD1 includes a first gain map GainMap1 as the first map Map1 and a first offset map OffetMap1 as the second map Map2, which are stored in the memory MEM. The second compensation data CD2 includes the second offset map OffetMap2 as the third map Map3, which is stored in the memory MEM.

In other words, the first map Map1, the second map Map2, and the third map Map3 are stored in the memory MEM, and the luminance uniformity of the display panel 110 may be enhanced by the first map Map1 to the third map Map3.

Figure 6:
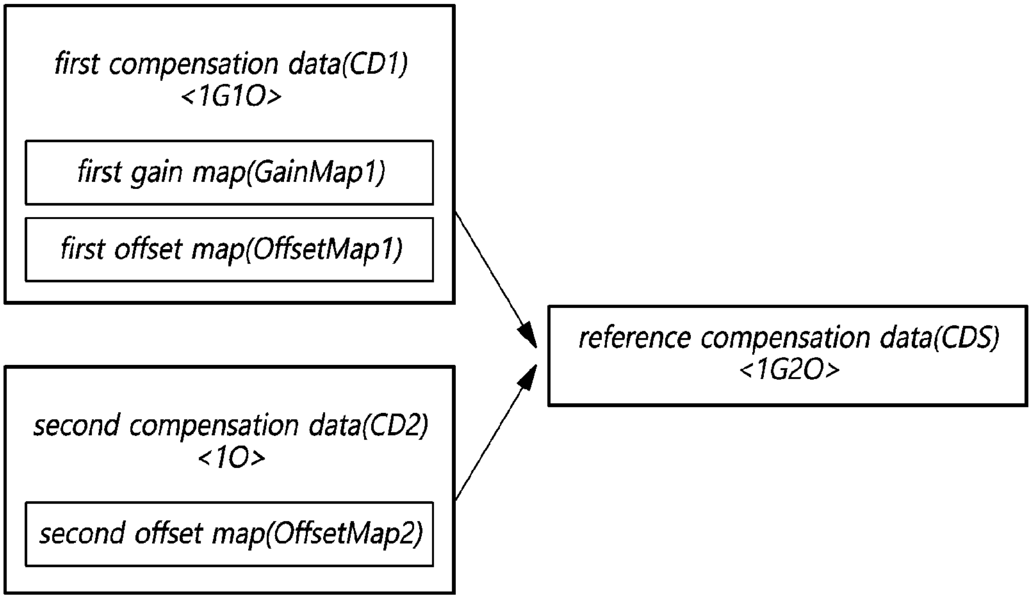
FIG. 6 is a view illustrating reference compensation data according to embodiments of the disclosure.

FIG. 6 is a view illustrating reference compensation data CDS according to embodiments of the disclosure.

The first compensation data CD1 and second compensation data CD2 are stored in the memory MEM.

Referring to FIG. 6, since the first compensation data CD1 includes the first gain map GainMap1 and the first offset map OffetMap1, the first compensation data CD1 may be expressed as "1G1O".

Referring to FIG. 6, since the second compensation data CD2 includes the second offset map OffetMap2, the second compensation data CD2 may be expressed as "1O".

The reference compensation data CDS may be compensation data in which the first compensation data CD1 and the second compensation data CD2 have been integrated. Since the first compensation data CD1 is 1G1O and the second compensation data CD2 is 1O, the reference compensation data CDS may be referred to as "1G2O".

The luminance uniformity of the display panel 110 may be enhanced by the reference compensation data CDS.

Figure 7:
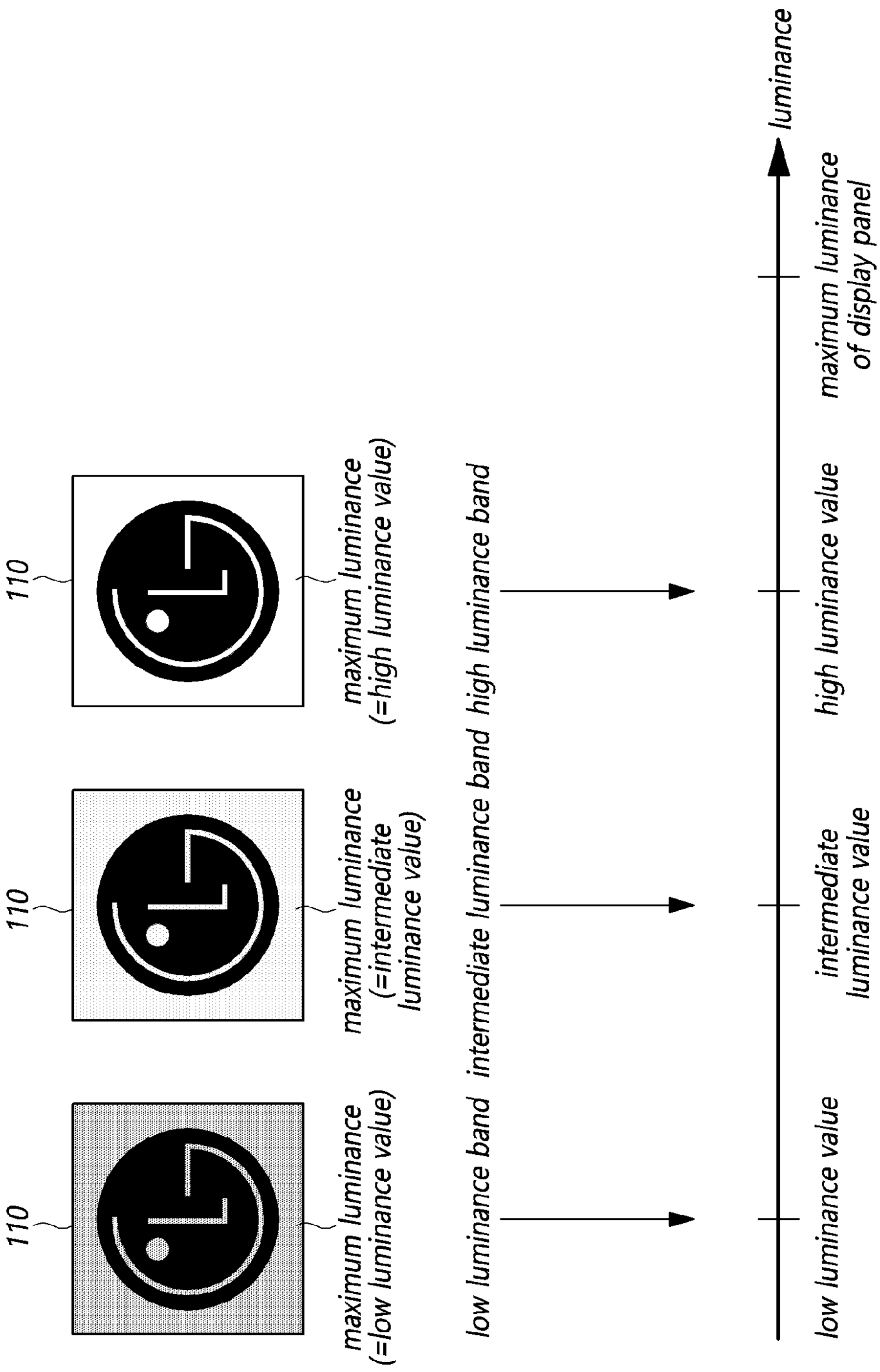
FIG. 7 is a view illustrating a luminance band according to embodiments of the disclosure.

FIG. 7 is a view illustrating a luminance band according to embodiments of the disclosure.

When the display panel 110 is driven to display a solid pattern, the maximum luminance value of the display panel 110 exists. When the display panel 110 is driven with the maximum luminance value, the display panel 110 may be driven with the brightest luminance value.

To express the image frame, the display panel 110 must be driven at various grayscales. The various grayscales may be, e.g., 0 grayscale to 255 grayscale. In this case, the above-described maximum luminance is luminance at 255 grayscale.

The display panel 110 is not driven only with the brightest luminance, and the maximum luminance may be reduced according to the use environment.

When the display panel 110 is driven in a bright environment, the display panel 110 may be driven with bright luminance to increase visibility. In this case, the maximum luminance of the display panel 110 may be set to a high luminance value and driven. For example, when the display panel 110 expresses 255 grayscale, the luminance corresponding to 255 grayscale may be a high luminance value. In this case, luminances that may be output from the display panel 110 while maintaining the maximum luminance as a high luminance value may be referred to as a "high luminance band".

When the display panel 110 is driven in an environment that is neither too bright nor too dark, such as inside a building, the display panel 110 may be driven with an intermediate luminance. In this case, the maximum luminance of the display panel 110 may be set to an intermediate luminance value and driven. For example, when the display panel 110 expresses 255 grayscale, the luminance corresponding to 255 grayscale may be an intermediate luminance value. In this case, luminances that may be output from the display panel 110 while maintaining the maximum luminance as an intermediate luminance value may be referred to as an "intermediate luminance band".

When the display panel 110 is driven in a dark environment, too bright luminance may cause discomfort to the user. Since visibility of the display panel 110 may be high even at low luminance in a dark environment, the display panel 110 may be driven with low luminance. In this case, the maximum luminance of the display panel 110 may be set to a low luminance value and driven. For example, when the display panel 110 expresses 255 grayscale, the luminance corresponding to 255 grayscale may be a low luminance value. In this case, luminances that may be output from the display panel 110 while maintaining the maximum luminance as a low luminance value may be referred to as a "low luminance band".

In other words, the luminance band may be defined as luminances that may be output from the display panel 110 while maintaining the maximum luminance as a specific luminance value. Since the luminance may be in nits, the luminance band may be referred to as a nit band. For example, the luminances that may be output from the display panel 110 with the maximum luminance set to 300 nits may be referred to as a "300 nit band".

Figure 8:
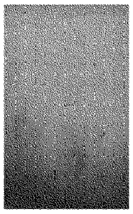
FIG. 8 is a view illustrating the luminance of a display panel according to the luminance band according to embodiments of the disclosure.
Figure 8:
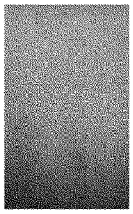
Figure 8:
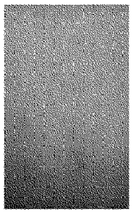
Figure 8:
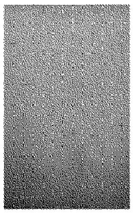
Figure 8:
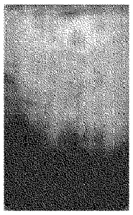
Figure 8:
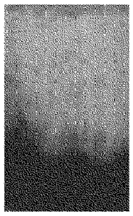
Figure 8:
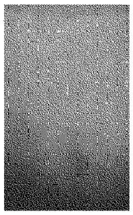
Figure 8:
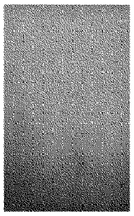

FIG. 8 is a view illustrating the luminance of a display panel 110 according to the luminance band according to embodiments of the disclosure.

Referring to FIG. 6, it may be identified that the first compensation data CD1, the second compensation data CD2, and the reference compensation data CDS were derived.

The first compensation data CD1, the second compensation data CD2, and the reference compensation data CDS were derived based on the photographed image IMG of the display panel 110 driven to display a solid pattern.

When the display panel 110 is driven to display a solid pattern, the display panel 110 may be driven with the maximum luminance set as an intermediate luminance value.

In other words, the first compensation data CD1, the second compensation data CD2, and the reference compensation data CDS may be data derived with respect to the "intermediate luminance band" which is luminances that may be output from the display panel 110 with the maximum luminance set as an intermediate luminance value.

The luminance uniformity of the display panel 110 representing the intermediate luminance band may be enhanced by using the reference compensation data CDS for the intermediate luminance band.

Further, the luminance uniformity of the display panel 110 representing other luminance bands may be enhanced by using the reference compensation data CDS for the intermediate luminance band.

Further, when the display panel 110 representing the low luminance band is compensated by the reference compensation data CDS for the intermediate luminance band, the luminance of the display panel 110 may not be enhanced.

Referring to FIG. 8, it may be identified that the luminance uniformity of the display panel 110 representing the intermediate luminance band is enhanced when the first data voltage Vdata1 is supplied to the display panel 110 representing the intermediate luminance band. However, it may be identified that the luminance of the display panel 110 representing the low luminance band is not uniform when the first data voltage Vdata1 is supplied to the display panel 110 representing the low luminance band. The same applies when the second to fourth data voltages Vdata2 to Vdata4 are supplied. In particular, it may be identified that when the first data voltage Vdata1 is supplied, the luminance of the display panel 110 representing the low luminance band is the most non-uniform. There are grayscales respectively corresponding to the first data voltage Vdata1 to the fourth data voltage Vdata4, and the grayscale corresponding to the first data voltage Vdata1 may be the lowest grayscale.

In other words, when the display panel 110 representing the low luminance band is compensated by the reference compensation data CDS for the intermediate luminance band, the luminance of the display panel 110 may not be enhanced.

To address the above-described issues, the third compensation data CD3 may be generated using the method for deriving the second compensation data CD2. However, due to the limitation of the storage space of the memory MEM, it is difficult to store the third compensation data CD3.

In other words, it is difficult to adopt a method for simply generating and storing the third compensation data CD3.

Embodiments of the disclosure may provide a display panel compensation method capable of enhancing the luminance uniformity of the display panel 110 while efficiently utilizing memory (MEM) space.

Embodiments of the disclosure may provide a display panel compensation method capable of enhancing the luminance uniformity of the display panel 110 representing a low luminance band. A detailed description thereof is given below.

Embodiments of the disclosure may provide a display panel compensation method capable of low power consumption by enhancing the luminance uniformity of the display panel 110. A detailed description thereof is given below.

Figure 9:
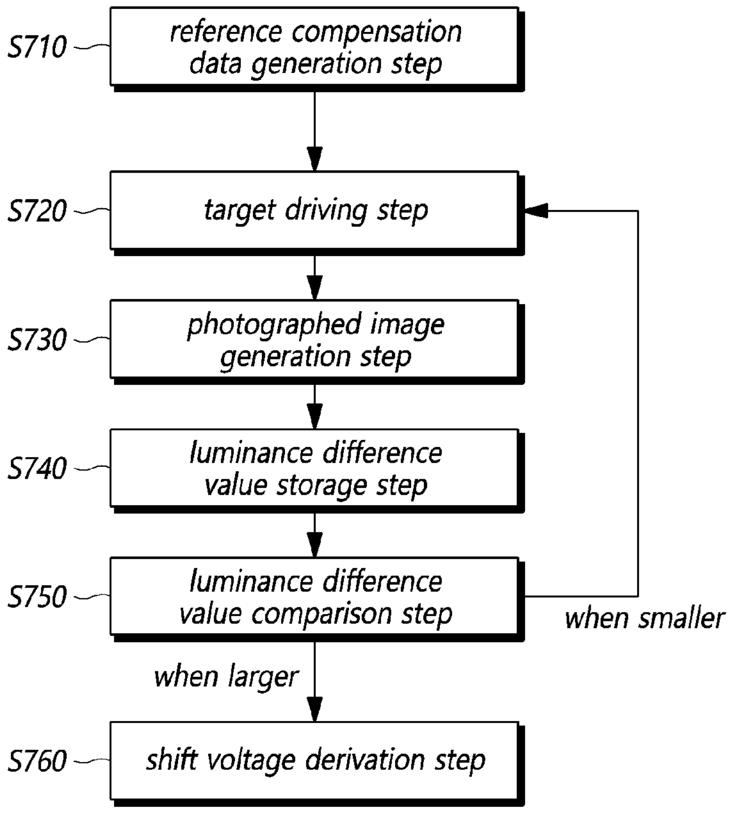
FIG. 9 is a flowchart illustrating a method for generating compensation data according to embodiments of the disclosure.
Figure 10:
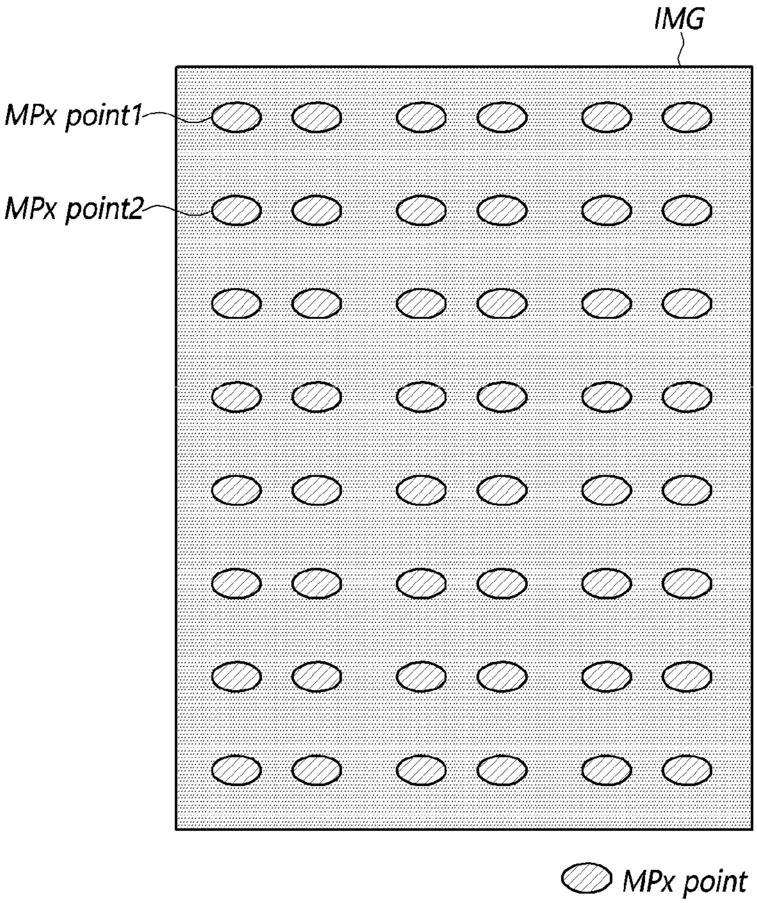
FIG. 10 is a view illustrating a display panel according to embodiments of the disclosure.

FIG. 9 is a flowchart illustrating a method for generating compensation data according to embodiments of the disclosure. FIG. 10 is a view of a photographed image IMG and specific points (MPx points) according to embodiments of the disclosure. FIG. 11 is a view illustrating example values of a compensation data generation method according to embodiments of the disclosure.

A compensation data generation method may include a reference compensation data generation step S710, a target driving step S720, a photographed image generation step S730, a luminance difference value storage step S740, a luminance difference value comparison step S750, and a shift voltage derivation step S760.

The reference compensation data generation step S710 may be the step of generating the reference compensation data CDS.

The reference compensation data CDS may be reference compensation data CDS for the intermediate luminance band.

The reference compensation data CDS is derived by the method shown in FIGS. 5 and 6.

The reference compensation data CDS may be compensation data in which the first compensation data CD1 and the second compensation data CD2 have been integrated.

The reference compensation data CDS may be stored in the memory MEM.

After the reference compensation data generating step S710, the target driving step S720 may proceed.

The target driving step S720 may be the step of driving the display panel 110 to a target to enhance luminance uniformity.

In the target driving step S720, the display panel 110 may be driven at the grayscale for a predetermined luminance included in a specific luminance band.

For example, the specific luminance band may be the low luminance band shown in FIG. 8. However, the low luminance value, which is the maximum luminance of the low luminance band, may be set in various ways.

For example, the display panel 110 may be driven at the grayscale for 1-1th luminance included in the first low luminance band. The display panel 110 may be driven at the grayscale for 1-2th luminance included in the first low luminance band. The grayscale for the 1-1th luminance may be smaller than the grayscale for the 1-2th luminance.

For example, the display panel 110 may be driven at the grayscale for 2-1th luminance included in the second low luminance band. The display panel 110 may be driven at the grayscale for 2-2th luminance included in the second low luminance band. The grayscale for the 2-1th luminance may be smaller than the grayscale for the 2-2th luminance.

The display panel 110 may be driven at the grayscale for a predetermined luminance included in a specific luminance band, and the luminance uniformity of the display panel 110 may be enhanced based on a photographed image IMG of the corresponding display panel 110.

The maximum luminance of the first low luminance band may be less than the maximum luminance of the second low luminance band.

When the display panel 110 is driven at the grayscale for a predetermined luminance included in a specific luminance band, image data may be compensated with a temporary shift voltage (TSV).

After the target driving step S720, the photographed image generation step S730 may proceed.

The photographed image generation step S730 may be the step of photographing the display panel 110 through the camera device 12.

In the photographed image generation step S730, the photographed image IMG may be generated by photographing the display panel 110. The photographed image may be output to the display compensation device 11.

The photographed image IMG may be a luminance data group LDG" including a plurality of luminance data LD".

The plurality of luminance data LD" may be data corresponding to the luminance value for a specific position of the display panel 110.

The number of luminance data LD" may correspond to the size of the resolution of the display panel 110. For example, if the resolution of the display panel 110 is HD (1280*720), the number of luminance data LD" may be 1280*720. If the resolution of the display panel 110 is FHD (1920*1080), the number of luminance data LD" may be 1920*1080. If the resolution of the display panel 110 is UHD (3840*2160), the number of luminance data LD" may be 3840*2160.

After the photographed image generation step S730, the luminance difference value storage step S740 may proceed.

The luminance difference value storage step S740 may be the step of storing a luminance difference value diff, which is a difference between maximum luminance data and minimum luminance data for the photographed image IMG.

In the luminance difference value storage step S740, a point luminance data group PLDG may be generated based on the luminance data LD" for specific points (MPx points) of the photographed image IMG among the plurality of luminance data LD".

The specific point (MPx point) may be an arbitrary point of the photographed image IMG set by the user. For example, referring to FIG. 10, the number of specific points (MPx points) may be 48. The specific points (MPx points) maintain regular intervals, and the number thereof may be 6 horizontally or 8 vertically. However, this is merely an example, and the specific point (MPx point) may be set in various ways.

The position of the specific point (MPx point) may be set to derive a luminance difference value diff between the maximum and minimum luminances of the photographed image IMG. For the above-described purpose, the position of the specific point (MPx point) may be set in various ways.

The specific point (MPx point) may include several subpixels SP, and in this case, the luminance of the specific point (MPx point) may be the luminance value due to the emission of several subpixels SP. However, only one subpixel SP may be included in the specific point (MPx point), and in this case, the luminance of the specific point (MPx point) may be the luminance value due to the emission of one subpixel SP.

In other words, in the luminance difference value storage step S740, a point luminance data group PLDG may be generated based on the luminance data LD for specific points (MPx points) of the photographed image IMG among the plurality of luminance data LD".

The point luminance data group PLDG may include a plurality of point luminance data PLD.

Each of the plurality of point luminance data PLD may be luminance intensity data for the corresponding specific point (MPx point).

The point luminance data group PLDG may include maximum luminance data having the largest data size and minimum luminance data having the smallest data size.

In the luminance difference value storage step S740, the luminance difference value diff, which is a difference between the maximum luminance data and the minimum luminance data, may be derived, and may be temporarily stored in the display compensation device 11. For example, referring to FIG. 10, a first specific point MPx point1 may have the maximum luminance data, and a second specific point MPx point2 may have the minimum luminance data. In this case, the luminance difference value diff may be a data value obtained by subtracting the minimum luminance data of the second specific point MPx point2 from the maximum luminance data of the first specific point MPx point1.

After the luminance difference value storage step S740, the luminance difference value comparison step S750 may proceed. In this case, the luminance difference value diff stored in step S750 may be referred to as a "current luminance difference value diff".

The luminance difference value comparison step S750 may be the step of comparing the current luminance difference value diff and the previous luminance difference value diff.

In the luminance difference value comparison step S750, when it is determined that the current luminance difference value diff is smaller than the previous luminance difference value diff, the target driving step S720 may be repeatedly performed. After the second target driving step S720 is repeatedly performed, the second luminance difference value comparison step S750 may be performed. In other words, the target driving step S720 to the luminance difference value comparison step S750 may be repeated multiple times. When the target driving step S720 to the luminance difference value comparison step S750 proceed, there are the following characteristics.

When the second target driving step S720 proceeds again after the first luminance difference value comparison step S750, the image data may be corrected with the offset voltage data VOD1 corresponding to the unit offset voltage Voff as well as the reference compensation data CDS. Here, the unit offset voltage Voff is stored, as the first temporary shift voltage TSV1, in the display compensation device 11. In the second luminance difference value comparison step S750, when it is determined that the current luminance difference value diff is smaller than the previous luminance difference value diff, the second target driving step S720 may be repeatedly performed. In this case, the second temporary shift voltage TSV2 is generated by adding the unit offset voltage Voff to the first temporary shift voltage TSV1. When the third target driving step S720 proceeds, the image data may be corrected with offset voltage data VOD2 corresponding to the second temporary shift voltage TSV2 as well as the reference compensation data CDS. The above-described process may be repeated.

In the luminance difference value comparison step S750, when it is determined that the current luminance difference value diff is larger than the previous luminance difference value diff, the temporary shift voltage TSV and data corresponding to the temporary shift voltage TSV may be transmitted to the memory MEM.

Further, when the luminance difference value comparison step S750 first proceeds, the previous luminance difference value diff does not exist. In this case, the image data may be corrected with the offset voltage data VOD corresponding to the offset voltage Voff in addition to the reference compensation data CDS. Thereafter, the target driving step S720 may be repeatedly performed.

Referring to FIG. 11, a method for generating compensation data with exemplary values is described. However, this is merely an example for description and does not limit the compensation data generation method.

Referring to FIG. 11, five cases may be identified. Here, the unit offset voltage Voff is assumed to be 0.02. In the first case Casel, the first temporary shift voltage TSV1 may be set to 0. In the first case (Casel), the first luminance difference value d1 is 15. Since the previous luminance difference value does not exist, the second target driving step S720 is repeated.

Referring to FIG. 11, before the second target driving step S720 is repeated, the second temporary shift voltage TSV2 is set by adding 0.02, which is the unit offset voltage Voff, to the first temporary shift voltage TSV1. The second temporary shift voltage TSV2 may be 0.02. Thereafter, the second luminance difference value comparison step S750 proceeds. In this case, the current luminance difference value d2 is 13, and the previous luminance difference value d1 is 15. In other words, since the current luminance difference value d2 is smaller than the previous luminance difference value d1, the third target driving step S720 is repeated.

Referring to FIG. 11, before the third target driving step S720 is repeated, the third temporary shift voltage TSV3 is set by adding 0.02, which is the unit offset voltage Voff, to the second temporary shift voltage TSV2. The third temporary shift voltage TSV3 may be 0.04. Thereafter, the third luminance difference value comparison step S750 proceeds. In this case, the current luminance difference value d3 is 11, and the previous luminance difference value d2 is 13. In other words, since the current luminance difference value d3 is smaller than the previous luminance difference value d2, the fourth target driving step S720 is repeated.

Referring to FIG. 11, before the fourth target driving step S720 is repeated, the fourth temporary shift voltage TSV4 is set by adding 0.02, which is the unit offset voltage Voff, to the third temporary shift voltage TSV3. The fourth temporary shift voltage TSV4 may be 0.06. Thereafter, the fourth luminance difference value comparison step S750 proceeds. In this case, the current luminance difference value d4 is 10, and the previous luminance difference value d3 is 11. In other words, since the current luminance difference value d4 is smaller than the previous luminance difference value d3, the fifth target driving step S720 is repeated.

Referring to FIG. 11, before the fifth target driving step S720 is repeated, the fifth temporary shift voltage TSV5 is set by adding 0.02, which is the unit offset voltage Voff, to the fourth temporary shift voltage TSV4. The fifth temporary shift voltage TSV5 may be 0.08. Thereafter, the fifth luminance difference value comparison step S750 proceeds. In this case, the current luminance difference value d5 is 11, and the previous luminance difference value d4 is 10. In other words, since the current luminance difference value d5 is larger than the previous luminance difference value d4, the fourth temporary shift voltage TSV4 and data corresponding to the fourth temporary shift voltage TSV4 may be transmitted to the memory MEM.

After the luminance difference value comparison step S750, the shift voltage derivation step S760 may proceed.

The shift voltage derivation step S760 may be the step of deriving the temporary shift voltage TSV as the shift voltage SV.

In the luminance difference value comparison step S750, the memory MEM receives the temporary shift voltage TSV and data corresponding to the temporary shift voltage TSV.

Thereafter, the memory MEM may store the temporary shift voltage TSV as the shift voltage SV, and may also store the data corresponding to the shift voltage TSV.

When the display panel 110 is calibrated based on the reference compensation data CDS and the data corresponding to the shift voltage SV, the luminance difference diff between the maximum luminance and minimum luminance of the photographed image IMG is the lowest so that the luminance uniformity of the display panel 110 may be enhanced.

In other words, the luminance uniformity of the display panel 110 representing the low luminance band may be enhanced merely with the reference compensation data CDS and the shift voltage SV. Since only data for the shift voltage SV is stored in the memory MEM, the luminance uniformity of the display panel 110 may be enhanced with only a small amount of data.

As described above, according to embodiments of the disclosure, there may be provided a display compensation system and a display panel compensation method capable of enhancing the luminance uniformity of the display panel 110 while efficiently utilizing memory (MEM) space.

According to embodiments of the disclosure, there may be provided a display compensation system and a display panel compensation method capable of enhancing the luminance uniformity of the display panel 110 driven at a low grayscale.

According to embodiments of the disclosure, there may be provided a display compensation system and a display panel compensation method capable of low power consumption by enhancing the luminance uniformity of the display panel 110.

Embodiments of the disclosure described above are briefly described below.

Embodiments of the disclosure may provide a method for compensating for a display panel, comprising a target driving step of generating a current temporary shift voltage by adding a unit offset voltage to a previous temporary shift voltage, generating modified image data by compensating for image data based on the current temporary shift voltage, and driving the display panel based on the modified image data, a photographed image generation step of generating a photographed image by photographing a video image displayed by the display panel, a luminance difference value storage step of storing a luminance difference value which is a difference between maximum luminance data and minimum luminance data in the photographed image including a plurality of luminance data, a luminance difference value comparison step of comparing a current luminance difference value and a previous luminance difference value which are the luminance difference value, and a shift voltage derivation step of storing the previous temporary shift voltage as a shift voltage in a memory when the current luminance difference value is larger than the previous luminance difference value.

A second target driving step may proceed when the current luminance difference value is smaller than the previous luminance difference value.

In the second target driving step, a next temporary shift voltage may be generated by adding the unit offset voltage to the current temporary shift voltage.

A reference compensation data generation step may proceed before the target driving step. The reference compensation data generation step may be a step of generating reference compensation data for compensating for the display panel displaying an image frame based on the image data.

The reference compensation data may be generated based on the display panel representing an intermediate luminance band.

A plurality of subpixels may be disposed on the display panel. The plurality of subpixels may include a light emitting element and a driving transistor for driving the light emitting element. In the reference compensation data generation step, first compensation data including a first gain map for compensating for a mobility characteristic value of the driving transistor and a first offset map for compensating for a threshold voltage characteristic value of the driving transistor and second compensation data including a second offset map for compensating for the threshold voltage characteristic value of the driving transistor may be generated.

The reference compensation data may be compensation data produced by integrating the first compensation data and the second compensation data.

In the target driving step, the modified image data may be generated based on the reference compensation data and the current temporary shift voltage.

In the target driving step, the display panel may be driven at a grayscale for a luminance included in a low luminance band.

It will be apparent to those skilled in the art that various modifications and variations can be made in the display compensation system and the display panel compensation method of the present disclosure without departing from the technical idea or scope of the disclosure. Thus, it is intended that the present disclosure cover the modifications and variations of this disclosure provided they come within the scope of the appended claims and their equivalents.

What is claimed:

1. A method for compensating for a display panel, comprising:

a target driving step of generating a current temporary shift voltage by adding a unit offset voltage to a previous temporary shift voltage, generating modified image data by compensating for image data based on the current temporary shift voltage, and driving the display panel based on the modified image data;

a photographed image generation step of generating a photographed image by photographing a video image displayed by the display panel;

a luminance difference value storage step of storing a luminance difference value which is a difference between maximum luminance data and minimum luminance data in the photographed image including a plurality of luminance data;

a luminance difference value comparison step of comparing a current luminance difference value and a previous luminance difference value which are the luminance difference value; and a shift voltage derivation step of storing the previous temporary shift voltage as a shift voltage in a memory when the current luminance difference value is larger than the previous luminance difference value.

2. The method of claim 1, wherein a second target driving step proceeds when the current luminance difference value is smaller than the previous luminance difference value.

3. The method of claim 2, wherein in the second target driving step, a next temporary shift voltage is generated by adding the unit offset voltage to the current temporary shift voltage.

4. The method of claim 1, wherein a reference compensation data generation step proceeds before the target driving step, and wherein the reference compensation data generation step is a step of generating reference compensation data for compensating for the display panel displaying an image frame based on the image data.

5. The method of claim 4, wherein the reference compensation data is generated based on the display panel representing an intermediate luminance band.

6. The method of claim 4, wherein a plurality of subpixels are disposed on the display panel, wherein the plurality of subpixels include a light emitting element and a driving transistor for driving the light emitting element, and wherein in the reference compensation data generation step, first compensation data including a first gain map for compensating for a mobility characteristic value of the driving transistor and a first offset map for compensating for a threshold voltage characteristic value of the driving transistor and second compensation data including a second offset map for compensating for the threshold voltage characteristic value of the driving transistor are generated.

7. The method of claim 6, wherein the reference compensation data is compensation data produced by integrating the first compensation data and the second compensation data.

8. The method of claim 4, wherein in the target driving step, the modified image data is generated based on the reference compensation data and the current temporary shift voltage.

9. The method of claim 1, wherein in the target driving step, the display panel is driven at a grayscale for a luminance included in a low luminance band.

10. A display compensation system, comprising:

a camera device photographing an image displayed on a display panel; and a display compensation device receiving a photographed image from the camera device and generating compensation data based on the photographed image, wherein the photographed image is an image for the display panel driven based on modified image data produced by compensating for image data based on a current temporary shift voltage, wherein the current temporary shift voltage is a voltage produced by adding a unit offset voltage to a previous temporary shift voltage, wherein the display compensation device stores a luminance difference value which is a difference between maximum luminance data and minimum luminance data in the photographed image and then compares a current luminance difference value and a previous luminance difference value which are the luminance difference value, and wherein the previous temporary shift voltage is stored, as a shift voltage, in a memory when the current luminance difference value is larger than the previous luminance difference value.

11. The display compensation system of claim 10, wherein when the current luminance difference value is smaller than the previous luminance difference value, a next temporary shift voltage is generated by adding the unit offset voltage to the current temporary shift voltage.

12. The display compensation system of claim 10, wherein reference compensation data is stored in the memory, and wherein the reference compensation data is data for compensating for the image data.

13. The display compensation system of claim 12, wherein the reference compensation data is generated based on the display panel representing an intermediate luminance band.

14. The display compensation system of claim 12, wherein the modified image data is data generated based on the reference compensation data and the current temporary shift voltage.

15. The display compensation system of claim 10, wherein the photographed image is an image for the display panel driven at a grayscale for a luminance included in a low luminance band.

* * * * *